(12) United States Patent
Sasaki et al.

(10) Patent No.: US 11,479,944 B2
(45) Date of Patent: Oct. 25, 2022

(54) WORK MACHINE AND CAB

(71) Applicant: KOMATSU LTD., Tokyo (JP)

(72) Inventors: Makoto Sasaki, Tokyo (JP); Hiroaki Tanaka, Tokyo (JP); Takeshi Ikeda, Tokyo (JP)

(73) Assignee: KOMATSU LTD., Tokyo (JP)

( * ) Notice: Subject to any disclaimer, the term of this patent is extended or adjusted under 35 U.S.C. 154(b) by 90 days.

(21) Appl. No.: 17/258,032

(22) PCT Filed: May 10, 2019

(86) PCT No.: PCT/JP2019/018721
§ 371 (c)(1),
(2) Date: Jan. 5, 2021

(87) PCT Pub. No.: WO2020/026551
PCT Pub. Date: Feb. 6, 2020

(65) Prior Publication Data
US 2021/0172153 A1 Jun. 10, 2021

(30) Foreign Application Priority Data
Jul. 31, 2018 (JP) .............................. JP2018-144542

(51) Int. Cl.
*B60J 7/00* (2006.01)
*E02F 9/16* (2006.01)
(Continued)

(52) U.S. Cl.
CPC .............. *E02F 9/163* (2013.01); *B62D 33/06* (2013.01); *B60Y 2200/412* (2013.01); *B62D 25/08* (2013.01); *E02F 9/2004* (2013.01)

(58) Field of Classification Search
CPC .. B62D 35/001; B62D 33/06; B62D 33/0617; B62D 33/067; B62D 33/0604;
(Continued)

(56) References Cited

U.S. PATENT DOCUMENTS

2009/0134665 A1 5/2009 Tsukamoto
2013/0221703 A1 8/2013 Kim
(Continued)

FOREIGN PATENT DOCUMENTS

CN 1486901 A 4/2004
CN 1724819 A 1/2006
(Continued)

OTHER PUBLICATIONS

Written Opinion of the International Searching Authority dated Jul. 23, 2019 for PCT/JP2019/018721.

*Primary Examiner* — Kiran B Patel
(74) *Attorney, Agent, or Firm* — Faegre Drinker Biddle & Reath LLP

(57) ABSTRACT

The cab includes a front pillar on the first side face and a front pillar disposed on the second side face and located behind the front pillar. The cab includes a front transparent member located between the first side face and the second side face and a lateral transparent member provided the second side face and connected to the front pillar. The cab includes a roller disposed on the front transparent member and a bracket disposed on the lateral transparent member and provided with a rail member to guide the roller.

12 Claims, 10 Drawing Sheets

(51) Int. Cl.
*B62D 33/06* (2006.01)
*B62D 25/08* (2006.01)
*E02F 9/20* (2006.01)

(58) Field of Classification Search
CPC .. B62D 25/145; B62D 25/2036; B62D 25/20; B60K 1/04; B60K 2001/0438
See application file for complete search history.

(56) References Cited

U.S. PATENT DOCUMENTS

2014/0292032 A1\* 10/2014 Sasaki .................... E02F 9/163
296/190.03
2020/0109537 A1\* 4/2020 Yamamitsu ............ E02F 9/163

FOREIGN PATENT DOCUMENTS

| | | |
|---|---|---|
| CN | 101242987 A | 8/2008 |
| CN | 103180518 A | 6/2013 |
| CN | 104649147 A | 5/2015 |
| EP | 1394019 A1 | 3/2004 |
| JP | S62-056682 U | 4/1987 |
| JP | H10-311063 A | 11/1998 |
| JP | 2001-115491 A | 4/2001 |
| JP | 2006-15985 A | 1/2006 |
| JP | 2006-327282 A | 12/2006 |
| JP | 2007-216957 A | 8/2007 |
| JP | 2009-137393 A | 6/2009 |
| JP | 2018-53599 A | 4/2018 |

\* cited by examiner (A)

(B)

(C)

WORK MACHINE AND CAB

TECHNICAL FIELD

The present disclosure relates to a work machine and a cab.

BACKGROUND ART

For example, Japanese Patent Laying-Open No. 2007-216957 (PTL 1) discloses a cab to be used in a work machine such as a hydraulic excavator. The cab disclosed in this publication is provided with pillars including a pair of front pillars disposed on both sides, respectively and a pair of rear pillars disposed on both sides, respectively.

CITATION LIST

Patent Literature

PTL 1: Japanese Patent Laying-Open No. 2007-216957

SUMMARY OF INVENTION

Technical Problem

In order to enhance the workability of an operator in a cab of a work machine, it is required to further improve the front visibility including the oblique front visibility.

An object of the present disclosure is to provide a work machine and a cab capable of improving the front visibility of an operator in the cab by moving the front pillar of the cab rearward.

Solution to Problem

The work machine of the present disclosure includes a cab. The cab has a first side face and a second side face facing the first side face and located closer to a work implement than the first side face. The cab includes: a first side-face front pillar disposed on a first side face; a second side-face front pillar disposed on a second side face and located behind the first side-face front pillar; a front transparent member located between the first side face and the second side face; a lateral transparent member disposed on the second side face and connected to the second side-face front pillar; a roller disposed on the front transparent member; and a bracket disposed on the lateral transparent member and provided with a rail member to guide the roller.

The cab of the present disclosure has a first side face and a second side face facing the first side face and located closer to a work implement than the first side face. The cab includes: a first side-face front pillar disposed on a first side face; a second side-face front pillar disposed on a second side face and located behind the first side-face front pillar; a front transparent member located between the first side face and the second side face; a lateral transparent member disposed on the second side face and connected to the second side-face front pillar; a roller disposed on the front transparent member; and a bracket disposed on the lateral transparent member and provided with a rail member to guide the roller.

Advantageous Effects of Invention

According to the present disclosure, it is possible for the work machine and the cab to improve the front visibility of the operator in the cab by moving the front pillar of the cab rearward.

DESCRIPTION OF EMBODIMENTS

Figure 1:
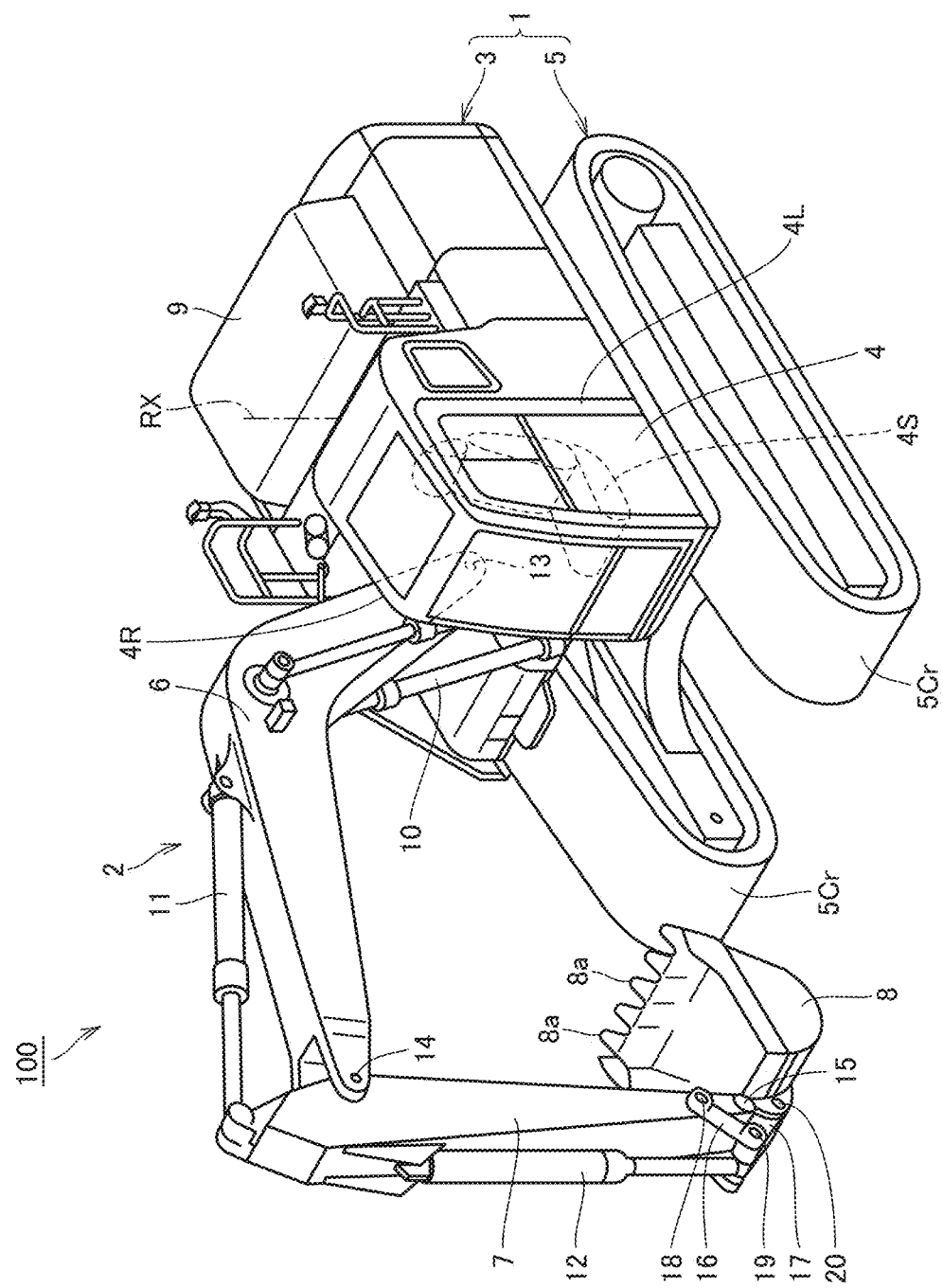
FIG. 1 is a perspective view illustrating a hydraulic excavator according to an embodiment.

Hereinafter, an embodiment will be described with reference to the drawings. In the following description, the same components having the same names and the same functions are denoted by the same reference numerals, and the detailed description thereof will not be repeated.

In the present embodiment, the description will be given on a hydraulic excavator which serves as an example of a work machine to which the concept of the present disclosure is applied. FIG. 1 is a perspective view illustrating a hydraulic excavator 100 according to an embodiment.

As illustrated in FIG. 1, the hydraulic excavator 100 includes a main body 1 and a work implement 2 operated by hydraulic pressure. The main body 1 includes a revolving unit 3 and a traveling unit 5. The traveling unit 5 is provided with a pair of crawler belts 5Cr. The hydraulic excavator 100 travels when the pair of crawler belts 5Cr rotate. The traveling unit 5 may be provided with wheels (tires) to replace the crawler belts 5Cr.

The revolving unit 3 is disposed on the traveling unit 5 and is supported by the traveling unit 5. The revolving unit 3 may resolve with respect to the traveling unit 5 about a revolution axis RX. The revolving unit 3 includes an engine compartment 9 in which an engine is accommodated, and a counterweight which is provided at a rear portion of the revolving unit 3. An engine and a hydraulic pump (not shown) are arranged in the engine compartment 9.

The revolving unit 3 includes a cab 4. An operator (a driver) of the hydraulic excavator 100 gets into the cab 4 to operate the hydraulic excavator 100. The cab 4 is provided with a driver's seat 4S on which the operator is seated. The operator in the cab 4 can operate the hydraulic excavator 100. The operator in the cab 4 can operate the work implement 2, revolve the revolving unit 3 relative to the traveling unit 5, and move the hydraulic excavator 100 by means of the traveling unit 5.

In the following description, the front-rear direction refers to a front direction and a rear direction of the operator seated on the driver's seat 4S in the cab 4. The direction facing the operator seated on the driver's seat 4S is defined as the front direction, and the direction backward the operator seated on the driver's seat 4S is defined as the rear direction. The left-right direction refers to a left direction and a right direction of the operator seated on the driver's seat 4S. When the operator seated on the driver's seat 4S faces the front, the right side and the left side of the operator are defined as the right direction and the left direction, respectively. The vertical direction refers to a direction orthogonal to a plane defined by the front-rear direction and the left-right direction. In the vertical direction, the side downward the ground is defined as a lower side, and the side upward the sky is defined as an upper side.

The work implement 2 is supported by the revolving unit 3. The work implement 2 includes a boom 6, an arm 7, and a bucket 8. The boom 6 is rotatably connected to the revolving unit 3. The arm 7 is rotatably connected to the boom 6. The bucket 8 is rotatably connected to the arm 7. The bucket 8 is provided with a plurality of teeth 8a.

The cab 4 has a first side face 4L and a second side face 4R facing each other. The second side face 4R of the cab 4 is located closer to the work implement 2 than the first side face 4L. In the present embodiment, the work implement 2 is arranged, for example, on the right side of the cab 4. Therefore, the first side face 4L of the cab 4 is, for example, the left side face, and the second side face 4R is, for example, the right side face.

The proximal end of the boom 6 is connected to the revolving unit 3 via a boom foot pin 13. The proximal end of the boom 6 is located on the opposite side to the first side face 4L relative to the second side face 4R of the cab 4. The proximal end of the arm 7 is connected to the distal end of the boom 6 via an arm pin 14. The bucket 8 is connected to the distal end of the arm 7 via a bucket pin 15.

The boom 6 is rotatable about the boom foot pin 13. The arm 7 is rotatable about the arm pin 14. The bucket 8 is rotatable about the bucket pin 15. The arm 7 and the bucket 8 are movable members at the distal end of the boom 6.

The work implement 2 further includes a boom cylinder 10, an arm cylinder 11, and a bucket cylinder 12. The boom cylinder 10 is configured to drive the boom 6. The arm cylinder 11 is configured to drive the arm 7. The bucket cylinder 12 is configured to drive the bucket 8. Each of the boom cylinder 10, the arm cylinder 11 and the bucket cylinder 12 is a hydraulic cylinder driven by hydraulic oil.

The work implement 2 further includes a bucket link. The bucket link includes a first link member 16 and a second link member 17. The distal end of the first link member 16 and the distal end of the second link member 17 are rotatably connected to each other via a bucket cylinder top pin 19. The bucket cylinder top pin 19 is further connected to the distal end of the bucket cylinder 12. Thus, the first link member 16 and the second link member 17 are connected to the bucket cylinder 12 via pin connection.

The proximal end of the first link member 16 is rotatably connected to the arm 7 via a first link pin 18 located near the bucket pin 15 at the distal end of the arm 7. Thus, the first link member 16 is connected to the arm 7 via pin connection. The proximal end of the second link member 17 is rotatably connected to a bracket disposed at a root portion of the bucket 8 via a second link pin 20. Thus, the second link member 17 is connected to the bucket 8 via pin connection.

Figure 2:
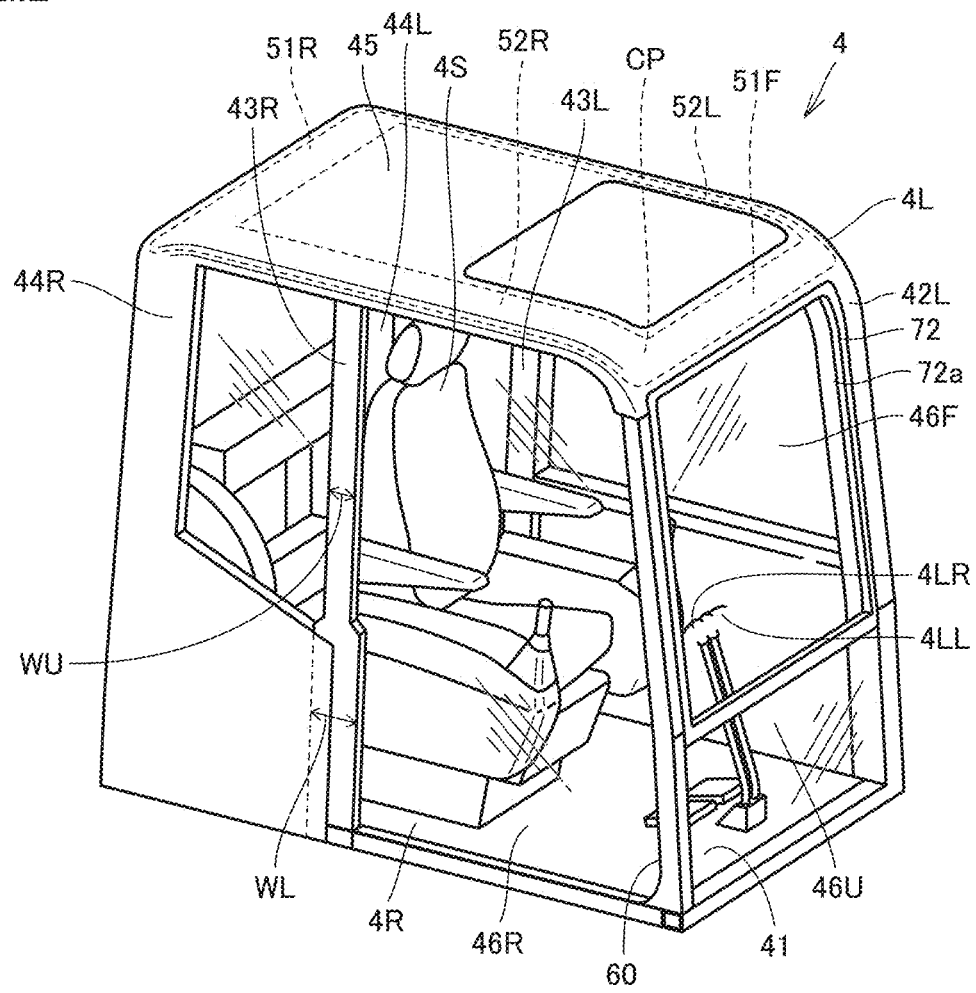
FIG. 2 is a perspective view illustrating a cab included in the hydraulic excavator illustrated in FIG. 1.
Figure 3:
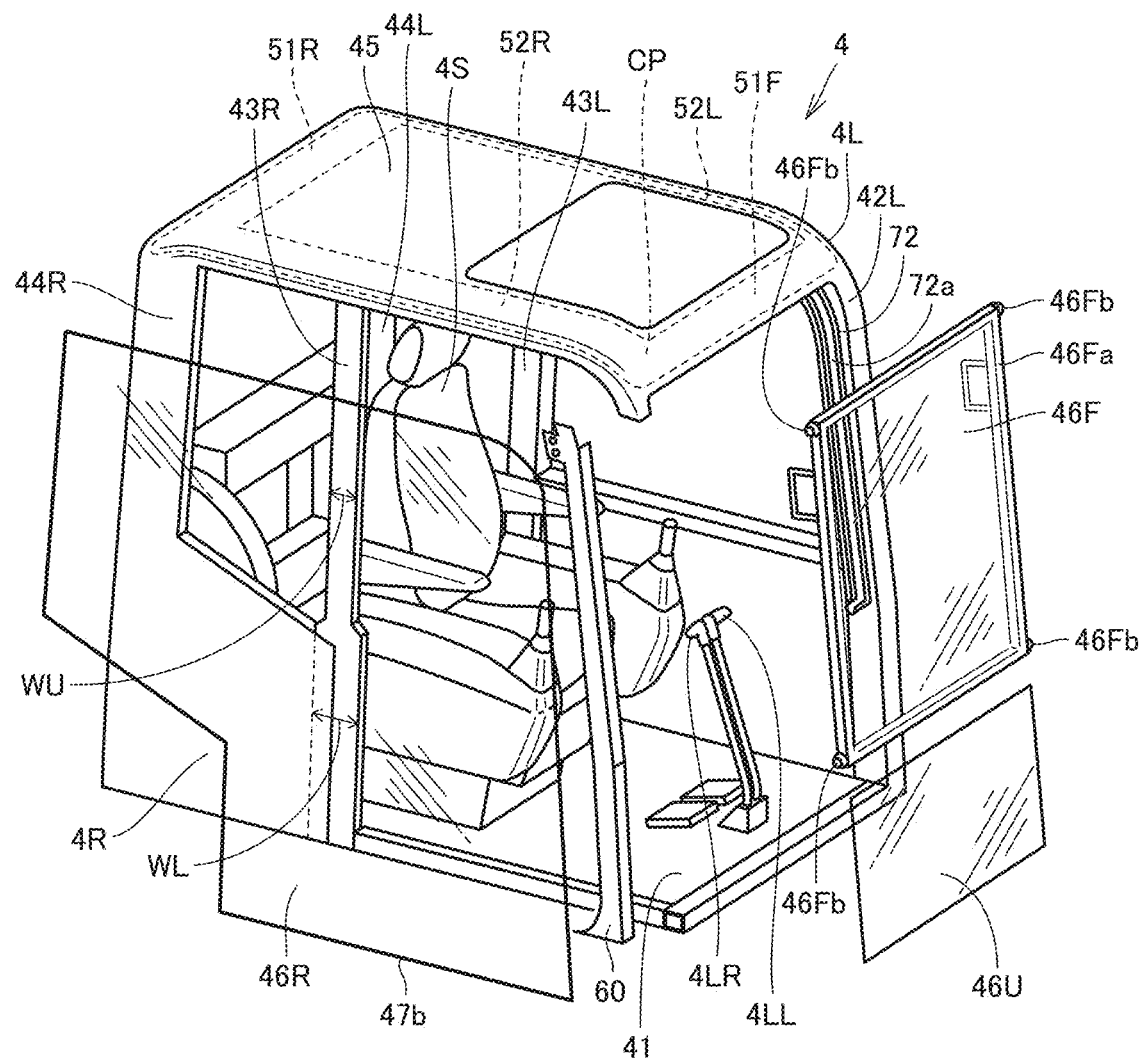
FIG. 3 is an exploded perspective view illustrating the cab of FIG. 2.

FIG. 2 is a perspective view illustrating a cab included in the hydraulic excavator illustrated in FIG. 1, and FIG. 3 is an exploded perspective view illustrating the cab of FIG. 2. As illustrated in FIG. 2, the cab 4 of the present embodiment mainly includes a floor member 41, a front pillar 42L (first side-face front pillar), a front pillar 43R (second side-face front pillar), a central pillar 43L, a pair of left and right rear pillars 44R and 44L, a pair of left and right beam members 51F and 51R, a pair of left and right frame members 52R and 52L, and a roof member 45.

The floor member 41 is arranged at the bottom of the cab 4. The floor member 41 is made of a flat plate. The pair of front pillars 42L and 43R, the central pillar 43L, and the pair of left and right rear pillars 44R and 44L are vertically arranged on the floor member 41. Each of these pillars 42L, 43R, 43L, 44R and 44L is connected to the floor member 41. Each of these pillars 42L, 43R, 43L, 44R and 44L is arranged such that the longitudinal length thereof extends in the vertical direction.

The front pillar 42L is connected to the floor member 41 at the front end of the first side face 4L. The central pillar 43L is disposed on the first side face 4L and located behind the front pillar 42L. The front pillar 43R is disposed on the second side face 4R and located behind the front pillar 42L. The front pillar 43R is disposed at a position opposite to the central pillar 43L in the left-right direction. A width WL of a lower portion of the front pillar 43R is larger than a width WU of an upper portion of the front pillar 43R.

The rear pillar 44L is disposed on the first side face 4L and located behind the central pillar 43L. The rear pillar 44R is disposed on the second side face 4R and located behind the front pillar 43R. The rear pillar 44R is disposed at a position opposite to the rear pillar 44L in the left-right direction. No additional pillar is disposed on the second side face 4R between the front pillar 43R and the rear pillar 44R, and no additional pillar is disposed on the second side face 4R in front of the front pillar 43R.

The beam member 51F is configured to extend in the left-right direction between the first side face 4L and the second side face 4R, and has a first end (left end) and a second end (right end) in the left-right direction. The first end of the beam member 51F is connected to the upper end of the front pillar 42L.

The beam member 51R is disposed behind the beam member 51F. The beam member 51R is configured to extend in the left-right direction between the first side face 4L and the second side face 4R, and has a third end (left end) and a fourth end (right end) in the left-right direction. The third end of the beam member 51R is connected to the upper end of the rear pillar 44L. The fourth end of the beam member 51R is connected to the upper end of the rear pillar 44R.

The frame member 52L is configured to extend in the front-rear direction along the first side face 4L. The frame member 52L is connected to the upper end of the front pillar 42L, the upper end of the central pillar 43L, and the upper end of the rear pillar 44L. The frame member 52L is connected to the first end of the beam member 51F on the side of the first side face 4L and the third end of the beam member 51R on the side of the first side face 4L.

The frame member 52R is configured to extend in the front-rear direction along the second side face 4R. The frame member 52R is connected to the upper end of the front pillar 43R and the upper end of the rear pillar 44R. The frame member 52R is connected to the second end of the beam member 51F on the side of the second side face 4R and the fourth end of the beam member 51R on the side of the second side face 4R.

The floor member 41, the pillars 42L, 43R, 43L, 44R and 44L, the beam members 51F and 51R, and the frame members 52L and 52R are joined together by welding, for example, to form a cab frame. Thus, the cab frame is composed of the floor member 41, the pillars 42L, 43R, 43L, 44R and 44L, the beam members 51F and 51R, and the frame members 52L and 52R.

The cab 4 further includes a pair of travel control levers 4LL and 4LR. The pair of travel control levers 4LL and 4LR are operated by an operator seated on the driver's seat 4S to control the travel motion of the traveling unit 5. The pair of travel control levers 4LL and 4LR are disposed in front of the driver's seat 4S.

The driver's seat 4S and the pair of travel control levers 4LL and 4LR are all disposed inside the cab frame. The driver's seat 4S and the pair of travel control levers 4LL and 4LR are all disposed in a space surrounded by the floor member 41, the pillars 42L, 43R, 43L, 44R and 44L, the beam members 51F and 51R, and the frame members 52L and 52R.

The front pillar 42L is disposed in front of the driver's seat 4S. The front pillar 43R and the central pillar 43L are disposed on both sides of the driver's seat 4S, respectively. The pair of rear pillars 44R and 44L are disposed behind the driver's seat 4S on both sides, respectively.

The beam members 51F and 51R, the pair of left and right frame members 52R and 52L, and the roof member 45 are all disposed above the driver's seat 4S. The floor member 41 is disposed below the driver's seat 4S.

As illustrated in FIG. 3, the cab 4 further includes a front transparent member 46F, a lateral transparent member 46R, a lower transparent member 46U, and a bracket 60. Each of the front transparent member 46F, the lateral transparent member 46R, and the lower transparent member 46U has a flat plate shape, but each may have a circular shape.

The front transparent member 46F is disposed in a frame 46Fa. The frame 46Fa is empty in the center. The front transparent member 46F is disposed in the empty center of the frame 46Fa. The frame 46Fa is arranged along the peripheral edge of the front transparent member 46F. A seal member 46Fc (FIG. 7A) is disposed between the front transparent member 46F and the frame 46Fa.

The frame 46Fa is rotatably installed with a plurality of rollers 46Fb. Each of the plurality of rollers 46Fb is rotatable about a shaft extending in the left-right direction (the direction in which the first side face 4L and the second side face 4R face each other). The plurality of rollers 46Fb includes a roller disposed at a lower end of the frame 46Fa on the side of the first side face 4L, a roller disposed at a lower end of the frame 46Fa on the side of the second side face 4R, a roller disposed at an upper end of the frame 46Fa on the side of the first side face 4L, and a roller disposed at an upper end of the frame 46Fa on the side of the second side face 4R.

Each of the rollers disposed at the upper end and the lower end of the frame 46Fa on the side of the first side face 4L side is closer to the first side face 4L than the frame 46Fa. The rotation shaft of each of the rollers disposed at the upper end and the lower end of the frame 46Fa on the side of the first side face 4L is configured to extend from the frame 46Fa to the first side face 4L.

Each of the rollers disposed at the upper end and the lower end of the frame 46Fa on the side of the second side face 4R side is closer to the second side face 4R than the frame 46Fa. The rotation shaft of each of the rollers disposed at the upper end and the lower end of the frame 46Fa on the side of the second side face 4R is configured to extend from the frame 46Fa to the second side face 4R.

The seal member 47b is disposed to seal a gap between the lateral transparent member 46R and the cab frame. The seal member 47b is disposed to surround the lateral transparent member 46R. The seal member 47b is disposed, for example, between the lateral transparent member 46R and the bracket 60, between the lateral transparent member 46R and the frame member 52R, between the lateral transparent member 46R and the rear pillar 44R, and between the lateral transparent member 46R and the floor member 41. The seal member 47b is made of, for example, rubber.

As illustrated in FIG. 2, the bracket 60 is arranged to connect a connection portion CP between the beam member 51F and the frame member 52R to a front end of the floor member 41 on the side of the second side face 4R. The bracket 60 is detachably attached to the cab frame.

The front pillar 43R is disposed on the second side face 4R and located behind the front pillar 42L and the bracket 60. No additional pillar is provided on the second side face 4R of the cab 4 in front of the front pillar 43R. Therefore, the cab 4 does not have a pillar to connect the connection portion CP between the beam member 51F and the frame member 52R to the floor member 41. Instead, the bracket 60 is provided to connect the connection portion CP to the floor member 41.

One difference between the pillar and the bracket is that the pillar is integrated with the cab frame by welding or the like, whereas the bracket 60 is detachably attached to the cab frame by bolts or the like.

When the front transparent member 46F is closed in the front of the cab 4, the front transparent member 46F is located between the front pillar 42L and the bracket 60. When the front transparent member 46F is closed in the front of the cab 4, the front transparent member 46F is located in front of the front pillar 43R and the central pillar 43L, and is located in front of the driver's seat 4S. When the front transparent member 46F is closed in the front of the cab 4, the front transparent member 46F is located on the lateral side of the front pillar 42L, for example, and is located between the first side face 4L and the second side face 4R.

The lower transparent member 46U is disposed between the front pillar 42L and the bracket 60 and below the front transparent member 46F. The lower transparent member 46U is disposed in front of the front pillar 43R and the central pillar 43L as well as the driver's seat 4S. The lower transparent member 46U is disposed on the lateral side of the front pillar 42L, for example, and is located between the first side face 4L and the second side face 4R. The front transparent member 46F and the lower transparent member 46U are disposed between the beam member 51F and the front end of the floor member 41 when the front transparent member 46F is closed in the front of the cab 4.

The lateral transparent member 46R is located between the bracket 60 and the rear pillar 44R, and is configured to extend in the front-rear direction along the second side face 4R. The lateral transparent member 46R is disposed on the lateral side of the driver's seat 4S. The lateral transparent member 46R is disposed between the frame member 52R and a front end of the floor member 41 on the side of the second side face 4R. The lateral transparent member 46R extends from the bracket 60 rearward further than the front pillar 43R. However, the lateral transparent member 46R may be disposed only in front of the front pillar 43R.

Each of the front transparent member 46F, the lateral transparent member 46R and the lower transparent member 46U is made of glass, for example. Each of the front transparent member 46F, the lateral transparent member 46R and the lower transparent member 46U may be made of a transparent material such as acrylic resin other than glass.

Figure 4:
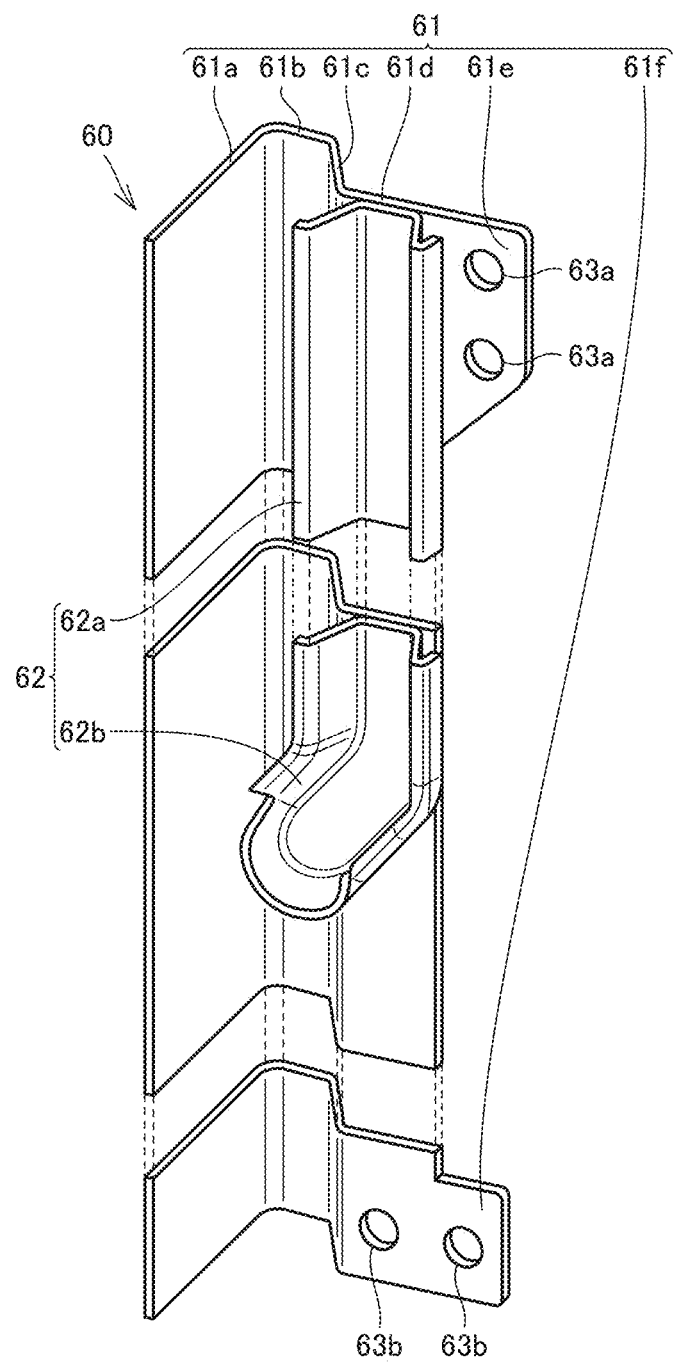
FIG. 4 is a perspective view illustrating a bracket according to a first example.
Figure 5:
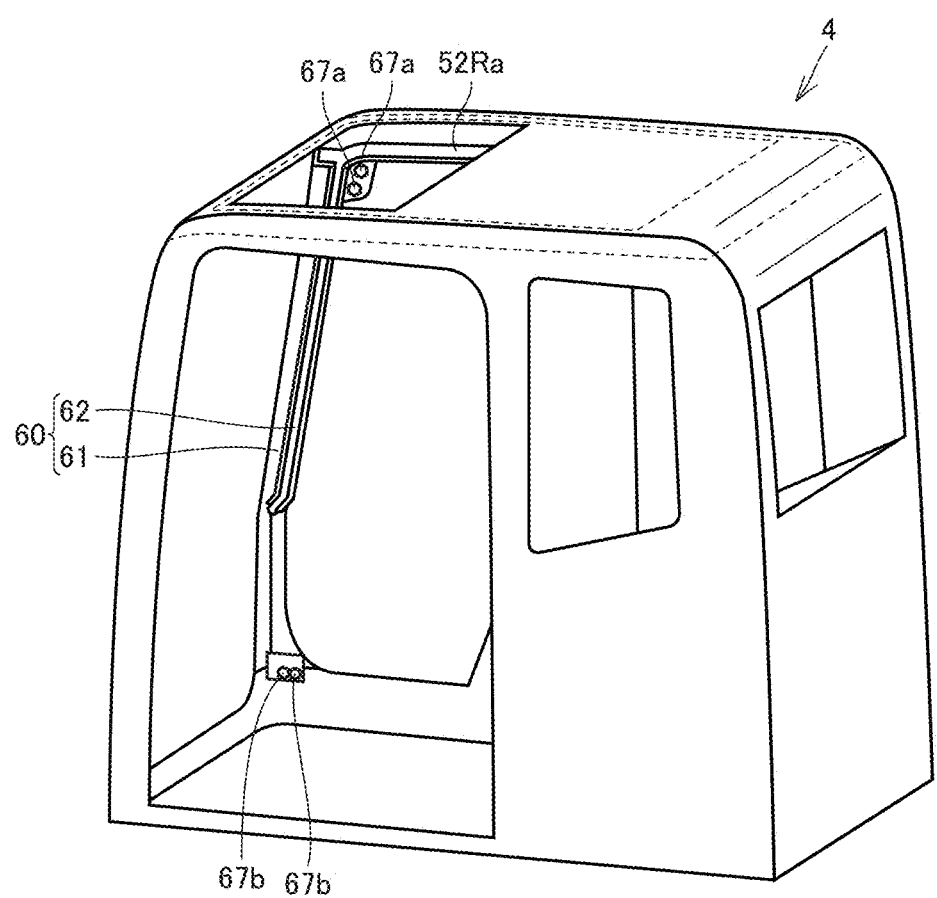
FIG. 5 is a perspective view illustrating a cab frame.
Figure 6:
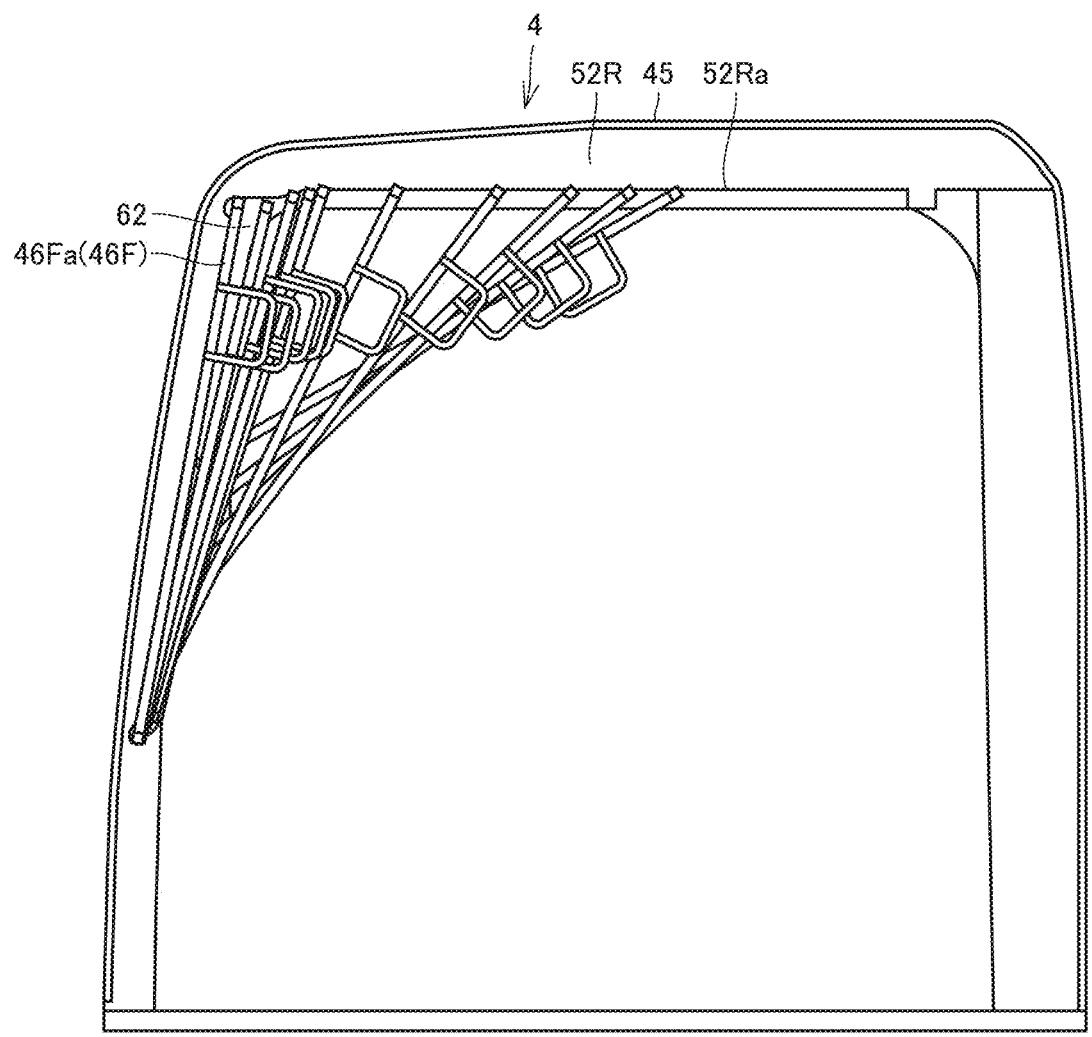
FIG. 6 is a view illustrating a front transparent member that is opened and closed in the front of the cab.

FIG. 4 is a perspective view illustrating a bracket according to a first example. FIG. 5 is a perspective view illustrating a cab frame. FIG. 6 is a view illustrating the front transparent member that is opened and closed in the front of the cab.

As illustrated in FIG. 4, the bracket 60 includes a bracket body 61 and a rail member 62. The bracket body 61 includes a front portion 61a, a connection portion 61b, an inclined portion 61c, a rail support portion 61d, and attachment portions 61e and 61f.

The bracket body 61 is formed by bending one flat plate member. Therefore, the front portion 61a, the connection portion 61b, the inclined portion 61c, the rail support portion 61d, and the attachment portions 61e and 61f are formed of one plate member.

The front portion 61a extends linearly in the left-right direction (the direction in which the first side face 4L and the second side face 4R face each other).

The connection portion 61b is connected to an end of the front portion 61a on the side of the second side face 4R. For example, the connection portion 61b is bent at a right angle relative to the front portion 61a, and is configured to extend linearly from the front portion 61a rearward.

The inclined portion 61c is connected to a rear end of the connection portion 61b. The inclined portion 61c is bent so as to be inclined relative to the connection portion 61b. The inclined portion 61c is configured to extend linearly rearward from the rear end of the connection portion 61b toward the first side face 4L.

The rail support portion 61d is connected to a rear end of the inclined portion 61c. The rail support portion 61d is bent so as to be inclined relative to the inclined portion 61c. The rail support portion 61d is configured to extend linearly rearward from the rear end of the inclined portion 61c. The direction in which the rail support portion 61d extends from the front side to the rear side is parallel to the direction in which the connection portion 61b extends from the front side to the rear side, for example.

The attachment portion 61e is connected to the rail support portion 61d near the upper end of the rail support portion 61d. The attachment portion 61e is configured to extend linearly from the rear end of the rail support portion 61d rearward. The attachment portion 61e is provided with at least a through hole 63a. The through hole 63a is for the insertion of a fixing member such as a bolt.

The attachment portion 61f is connected to the rail support portion 61d near the lower end of the rail support portion 61d. The attachment portion 61f is configured to extend linearly from the rear end of the rail support portion 61d rearward. The attachment portion 61f is provided with at least a through hole 63b. The through hole 63b may be provided near the lower end of the rail support portion 61d. The through hole 63b is for the insertion of a fixing member such as a bolt.

The rail member 62 is provided on the rail support portion 61d of the bracket body 61 by welding or the like. The rail member 62 includes an upper portion 62a and a lower portion 62b. Each of the upper portion 62a and the lower portion 62b is configured to extend linearly. The lower portion 62b is connected to the lower end of the upper portion 62a. The lower portion 62b is bent relative to the upper portion 62a. The lower portion 62b is inclined relative to the upper portion 62a such that the lower portion 62b extends obliquely downward along with an extension line of the upper portion 62a.

Each of the upper portion 62a and the lower portion 62b is provided with a groove. The groove of the upper portion 62a and the groove of the lower portion 62b are connected to each other. Therefore, the roller is movable in the groove of the upper portion 62a and the groove of the lower portion 62b.

Each groove in the upper portion 62a and the lower portion 62b has a tapered cross section, the width of which decreases in a direction from the first side face 4L toward the second side face 4R.

As illustrated in FIG. 5, the bracket 60 is attached to the cab frame by fixing members such as bolts 67a and 67b. Specifically, the bracket 60 is attached to the cab frame by inserting the bolts 67a and 67b through the through holes 63a and 63b as illustrated in FIG. 4 and screwing the bolts 67a and 67b in the cab frame.

After the bracket 60 is attached to the cab frame, the groove of the rail member 62 of the bracket 60 is connected to a rail groove 52Ra provided in the frame member 52R. Thus, the roller is movable in the groove provided in the rail member 62 and the rail groove 52Ra provided in the frame member 52R.

Thereby, it is possible to slide the frame 46Fa that holds the front transparent member 46F as illustrated in FIG. 6, which makes it possible to open and close the front transparent member 46F in the front of the cab 4. When the front transparent member 46F is closed in the front of the cab 4, the front transparent member 46F is positioned in front of the driver's seat 4S (FIG. 2). When the front transparent member 46F is opened from the front of the cab 4, the front transparent member 46F is positioned above the driver's seat 4S.

Figure 7:
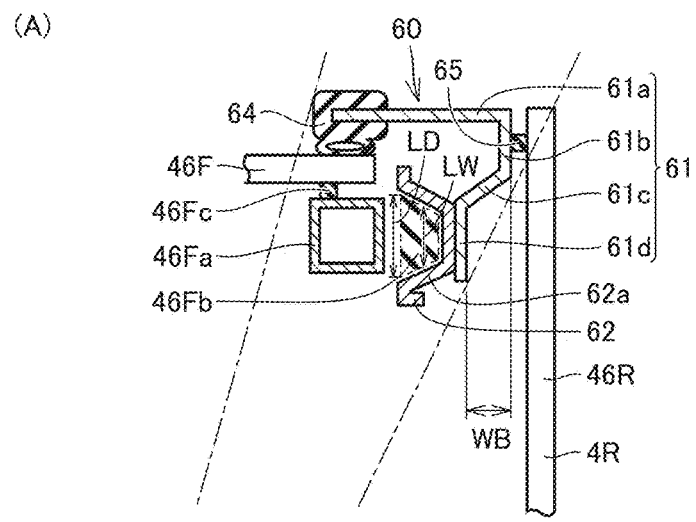
FIG. 7A is a cross-sectional view illustrating the configuration in the vicinity of the bracket according to the first example illustrated in FIG. 4.
FIG. 7B is a cross-sectional view illustrating the configuration in the vicinity of a bracket according to a second example.
FIG. 7C is a cross-sectional view illustrating the configuration in the vicinity of a front pillar.
Figure 7:
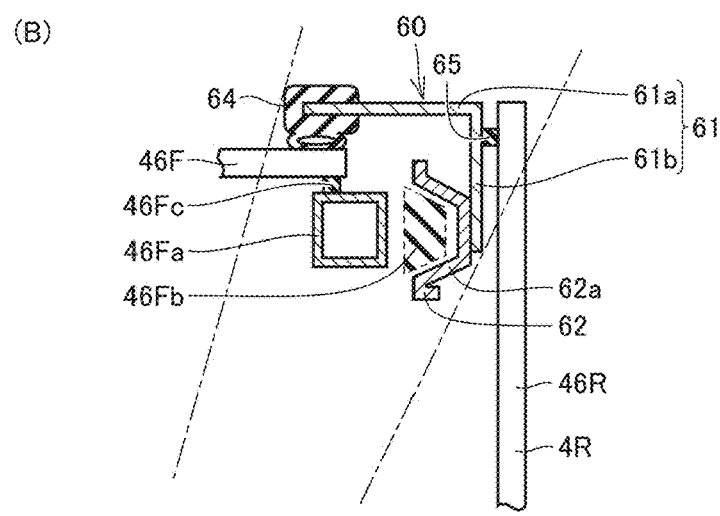
Figure 7:
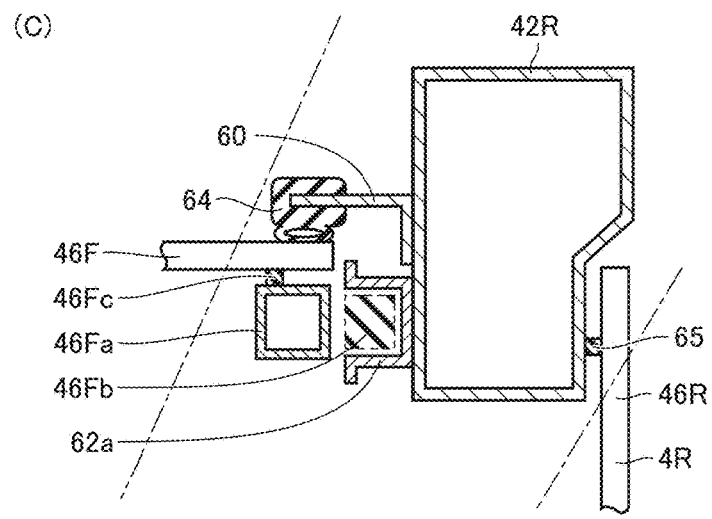

FIG. 7A is a cross-sectional view illustrating the configuration in the vicinity of the bracket according to the first example illustrated in FIG. 4. FIG. 7B is a cross-sectional view illustrating the configuration in the vicinity of a bracket according to a second example. FIG. 7C is a cross-sectional view illustrating the configuration in the vicinity of a front pillar.

As illustrated in FIG. 7A, the bracket 60 is disposed closer to the first side face 4L than the lateral transparent member 46R. The connection portion 61b of the bracket 60 and the surface of the lateral transparent member 46R toward the first side face 4L face each other.

The bracket 60 is connected to the lateral transparent member 46R. In the present disclosure, the case where the bracket 60 is connected to the lateral transparent member 46R includes a case where the bracket 60 is connected to the lateral transparent member 46R via another member such as the seal member 65, and a case where the bracket 60 is directly connected to the lateral transparent member 46R. The seal member 65 is disposed between the lateral transparent member 46R and the connection portion 61b.

As described above, the rail support portion 61d is connected to the connection portion 61b via the inclined portion 61c. Therefore, the rail support portion 61d is positioned closer to the first side face 4L than the connection portion 61b by a distance WB. The distance between the rail support portion 61d and the lateral transparent member 46R is larger than the distance between the connection portion 61b and the lateral transparent member 46R.

As described above, the rail member 62 is attached to the rail support portion 61d. The rail member 62 is provided with a groove. The roller 46Fb is arranged in the groove of the rail member 62. The roller 46Fb is rotatably attached to the frame 46Fa and is slidable in the groove of the rail member 62. The front transparent member 46F is disposed in the frame 46Fa via the seal member 46Fc.

The roller 46Fb has a tapered cross section, the width LD of which along the second side face 4R decreases in the direction from the first side face 4L toward the second side face 4R. The groove of the rail member 62 has a tapered cross section, the width LW of which along the second side face 4R decreases in the direction from the first side face 4L toward the second side face 4R.

A seal member 64 is attached to an end of the front portion 61a on the side of the first side face 4L. The rear end of the seal member 64 is positioned so as to abut the front surface of the front transparent member 46F when the front transparent member 46F is closed in the front of the cab 4.

As illustrated in FIG. 7B, the connection portion 61b of the bracket 60 may extend linearly rearward from the front portion 61a to the support portion of the rail member 62. In this case, the cross section of the bracket 60 is L-shaped. The distance between a portion of the bracket 60 where the seal member 65 is disposed and the lateral transparent member 46R is substantially equal to the distance between a portion of the bracket 60 where the rail member 62 is attached and the lateral transparent member 46R.

Other than that described above, the bracket 60 illustrated in FIG. 7B is substantially the same as the bracket 60 illustrated in FIG. 7A, the same reference numerals are given to the same elements, and the description thereof will not be repeated.

The shape of the cross section mentioned above refers to the shape of a cross section obtained by cutting a corresponding member along a plane extending in the front-rear direction and the left-right direction.

Figure 8:
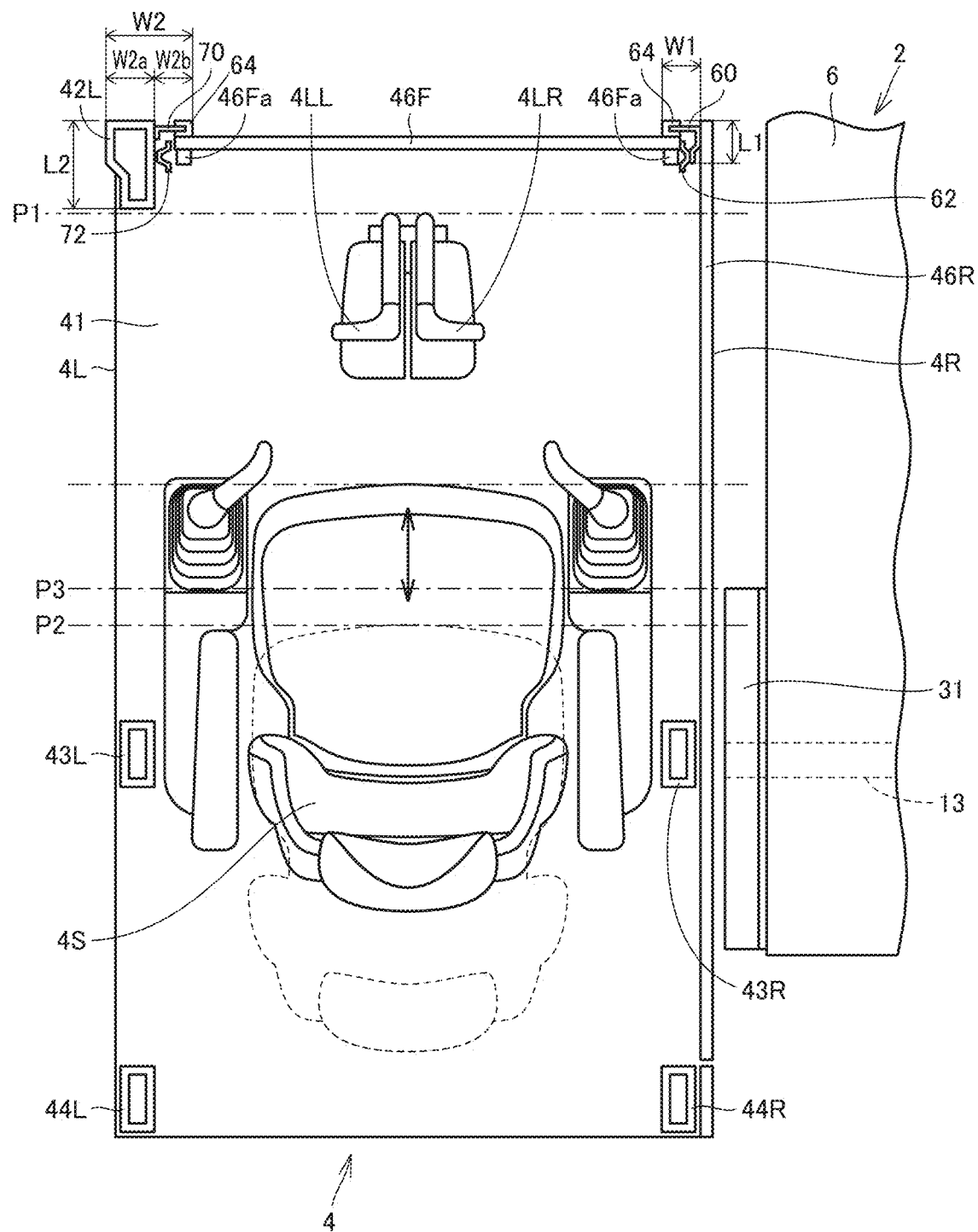
FIG. 8 is a plan view illustrating the internal configuration of the cab of FIG. 2 when viewed from a direction perpendicular to the floor surface.

FIG. 8 is a plan view illustrating the internal configuration of the cab of FIG. 2 when viewed from a direction perpendicular to the floor surface. As illustrated in FIG. 8, the cab 4 is provided with no additional pillar other than the front pillar 42L in front of a position P1 of the front end of the pair of travel control levers 4LL and 4LR. The front pillar 43R is located behind the position P1 of the front end of the pair of travel control levers 4LL and 4LR. The position P1 of the front end of the pair of travel control levers 4LL and 4LR refers to the position of the front end of the pair of travel control levers 4LL and 4LR when both are not operated by the operator.

The cab 4 is provided with no additional pillar other than the front pillar 42L in front of a position P2 of the front end of the driver's seat 4S. The front pillar 43R is located behind the position P2 of the front end of the driver's seat 4S. When the driver's seat 4S is slidable in the front-rear direction relative to the floor member 41, the position P2 of the front end of the driver's seat 4S means the position of the front end of the driver's seat 4S when the driver's seat 4S is slid to a most rearward position (shown by a broken line) relative to the floor member 41.

The boom 6 of the work implement 2 is supported by the revolving unit 3 on the side of the second side face 4R of the cab 4 (for example, the right side). The revolving unit 3 is provided with a boom mounting bracket 31 (also referred to as a work implement support bracket or a vertical plate) for supporting the boom 6. A boom foot pin 13 is inserted in the boom mounting bracket 31 and the boom 6. Thus, the boom 6 is attached to the boom mounting bracket 31 in such a manner that it is rotatable about the boom foot pin 13.

The boom mounting bracket 31 is disposed on the opposite side to the first side face 4L of the cab 4 relative to the front pillar 43R. The boom mounting bracket 31 faces the front pillar 43R with a gap interposed therebetween. The cab 4 is provided with no additional pillar other than the front pillar 42L in front of a position P3 of the front end of the boom mounting bracket 31. The front pillar 43R is located behind the position P3 of the front end of the boom mounting bracket 31.

The front pillar 42L is attached with a bracket 70 and a rail member 72. The seal member 64 is attached to an end portion of the bracket 70 on the side of the second side face 4R. When the front transparent member 46F is closed in the front of the cab 4, the seal member 64 is positioned so as to abut against the front surface of the front transparent member 46F. When the front transparent member 46F is closed in the front of the cab 4, the rollers attached to the frame 46Fa on the side of the first side face 4L are located in the groove of the rail member 72.

The length L1 of the bracket 60 in the front-rear direction (the first direction along the first side face 4L) is smaller than the length L2 of the front pillar 42L in the front-rear direction. Further, the width W1 of the bracket 60 in the left-right direction (the second direction orthogonal to the first direction) is smaller than the width W2a of the front pillar 42L in the left-right direction. Furthermore, the width W1 of the bracket 60 is smaller than the sum W2 of the width W2a of the front pillar 42L and the width W2b of the bracket 70.

Figure 9:
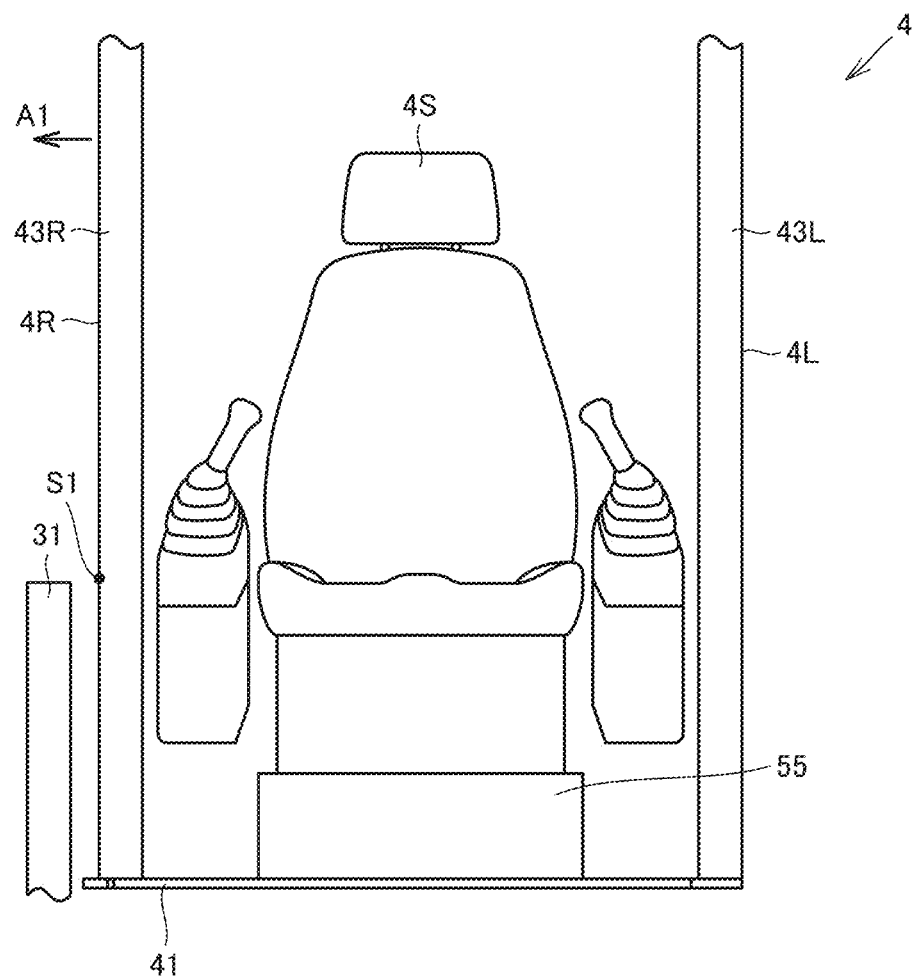
FIG. 9 is a view illustrating a relationship between the pillars and a boom mounting bracket provided in the cab of FIG. 2.

FIG. 9 is a view illustrating a relationship between the pillars and the boom mounting bracket provided in the cab of FIG. 2. As illustrated in FIG. 9, the boom mounting bracket 31 is disposed on the opposite side to the first side face 4L relative to the front pillar 43R. The boom mounting bracket 31 faces the front pillar 43R with a gap interposed therebetween in the left-right direction. The front pillar 43R extends upward beyond the upper end of the boom mounting bracket 31.

Next, the effects of the present embodiment will be described.

As illustrated in FIG. 1, in the work machine 100 of the present embodiment, the second side face 4R is disposed closer to the work implement 2 than the first side face 4L of the cab 4. Therefore, in order to allow the operator in the cab 4 to monitor the operation by the work implement 2, it is particularly important to ensure the front visibility including the oblique front visibility toward the second side face 4R of the cab 4 in the visual field of the operator.

As illustrated in FIG. 8, in the work machine 100 of the present embodiment, the front pillar 43R disposed on the second side face 4R is located behind the front pillar 42L. Although the bracket 60 is disposed on the second side face 4R, since the bracket 60 is not designed to ensure the strength of the cab frame like a pillar, the bracket 60 may be made thinner than a pillar.

Figure 10:
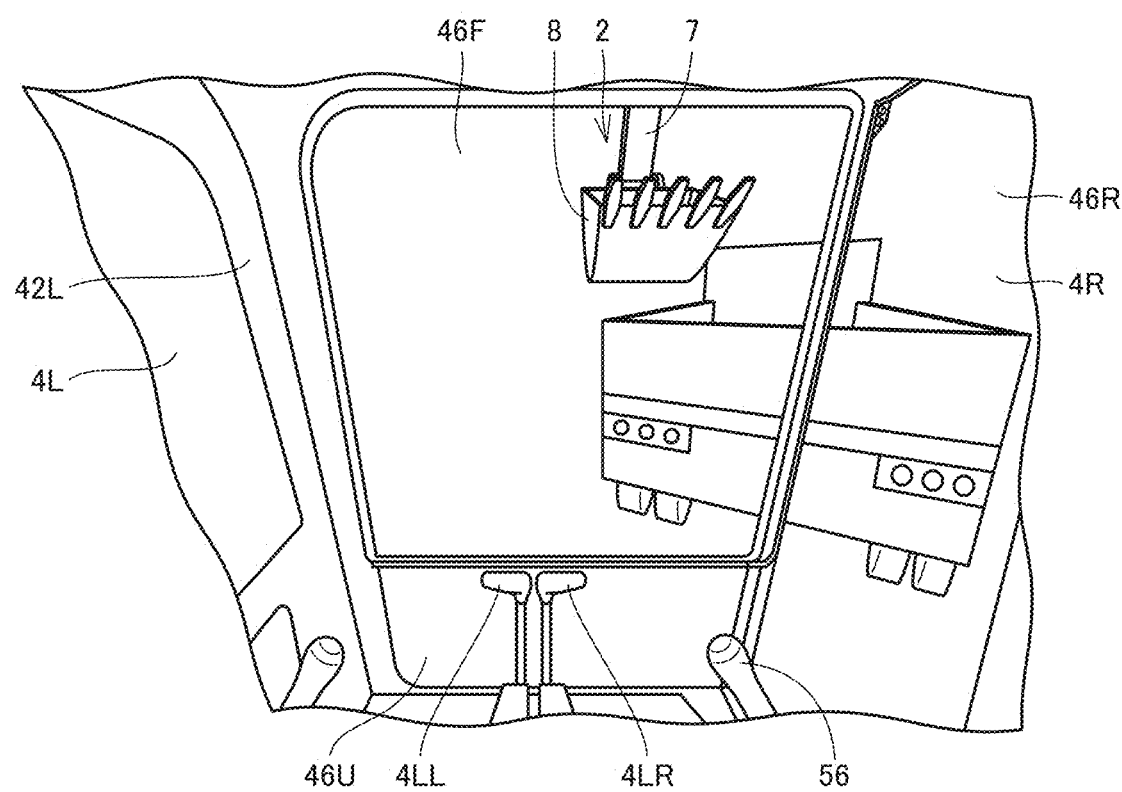
FIG. 10 is a view illustrating a front visual field of an operator seated on a driver's seat in the cab illustrated in FIG. 1.

Therefore, as compared with the case where the front pillar 42R is disposed on the second side face 4R of the cab 4 as illustrated in FIG. 7C, the use of the bracket 60 as illustrated in FIGS. 7A and 7B reduces the blind spot in the visual field of the operator in the cab 4 including the oblique front of the second side face 4R. Specifically, the visual field of the operator in the cab 4 is illustrated in FIG. 10. Thus, the front visibility of the operator in the cab 4 including the oblique front visibility toward the second side face 4R is improved, which thereby enhances the workability of the work implement 2.

In each of FIGS. 7A to 7C, an area sandwiched by two chain lines indicates a blind spot of the operator seated on the driver's seat 4S.

As described above, according to the work machine 100 of the present embodiment, it is possible to improve the front visibility of the operator in the cab 4 by moving the front pillar 43R of the cab 4 rearward.

The bracket 60 includes a rail member 62 for guiding the front transparent member 46F. Therefore, by sliding the front transparent member 46F along the rail member 62, it is possible to open and close the front transparent member 46F in the front of the cab 4.

FIG. 10 illustrates an example work to be performed by the work implement 2 in which the work implement 2 transfers the loads in the bucket 8 to the vessel of a dump truck. As illustrated in FIG. 10, the operator seated on the driver's seat 4S can clearly monitor the bucket 8 of the work implement 2 and the vessel of the dump truck in the visual field.

According to the present embodiment, as illustrated in FIG. 8, the length L1 of the bracket 60 in the front-rear direction (the first direction along the first side face 4L) is smaller than the length L2 of the front pillar 42L in the front-rear direction. Therefore, by providing the bracket 60 to replace the front pillar on the second side face 4R, it is possible to improve the front visibility of the operator in the cab 4 including the oblique front visibility toward the second side face 4R.

According to the present embodiment, as illustrated in FIG. 8, the width W1 of the bracket 60 in the left-right direction (the second direction orthogonal to the first direction) is smaller than the width W2a of the front pillar 42L in the left-right direction. Therefore, by providing the bracket 60 to replace the front pillar on the second side face 4R, it is possible to improve the front visibility of the operator in the cab 4 including the oblique front visibility toward the second side face 4R.

According to the present embodiment, as illustrated in FIG. 5, the bracket 60 is detachably attached to the cab frame composed of the front pillars 43L, 43R and the like by bolts 67a and 67b. Since the bracket 60 is detachably attached to the cab frame and is not designed to ensure the strength of the cab frame, the bracket 60 may be made thinner, which makes it possible to improve the front visibility of the operator in the cab 4 including the oblique front visibility toward the second side face 4R.

According to the present embodiment, as illustrated in FIGS. 7A and 7B, each of the roller 46Fb and the groove of the rail member 62 has a tapered cross section, the width LD or LW of which along the second side face 4R decrease in the direction from the first side face 4L toward the second side face 4R. Thus, it is possible to reduce the blind spot in the visual field of the operator in the cab 4 including the oblique front of the second side face 4R, which makes it possible to improve the front visibility of the operator in the cab 4 including the oblique front visibility toward the second side face 4R.

Further, since the roller 46Fb and the groove of the rail member 62 each have a tapered cross section, it is possible to ensure a large sliding area between the roller 46Fb and the groove of the rail member 62. Accordingly, it is possible to reduce the surface pressure between the roller 46Fb and the groove of the rail member 62.

According to the present embodiment, as illustrated in FIG. 7A, the rail support portion 61d of the bracket 60 is located behind the connection portion 61b and closer to the first side face 4L than the connection portion 61b. Thus, it is possible to narrow the extent that the bracket 60 blocks the front visibility of the operator in the cab 4. Therefore, it is possible to further improve the front visibility of the operator in the cab 4 including the oblique front visibility toward the second side face 4R.

In FIG. 7B, since the shape of the bracket 60 is simpler than that of the bracket 60 in FIG. 7A, it is easy to machine the bracket 60.

According to the present embodiment, as illustrated in FIG. 8, the front pillar 43R of the cab 4 is located behind the position P1 of the front end of the travel control levers 4LL and 4LR. Thus, as described above, it is possible to improve the front visibility of the operator including the oblique front visibility toward the second side face 4R, which makes it possible to enhance the workability of the work implement 2.

According to the present embodiment, as illustrated in FIG. 8, the front pillar 43R of the cab 4 is located behind the position P2 of the front end of the driver's seat 4S. Thus, as described above, it is possible to improve the front visibility of the operator including the oblique front visibility toward the second side face 4R, which makes it possible to further enhance the workability of the work implement 2.

According to the present embodiment, as illustrated in FIG. 8, the front pillar 43R of the cab 4 is located behind the position P3 of the front end of the boom mounting bracket 31. Thus, as described above, it is possible to improve the front visibility of the operator including the oblique front visibility toward the second side face 4R, which makes it possible to further enhance the workability of the work implement 2.

According to the present embodiment, as illustrated in FIG. 9, the boom mounting bracket 31 is disposed on the opposite side to the first side face 4L relative to the front pillar 43R. Thus, when the hydraulic excavator 100 falls down or the like and accordingly the front pillar 43R tilts in the direction indicated by an arrow A1, a portion S1 of the front pillar 43R contacts against the boom mounting bracket 31. Thus, the front pillar 43R is prevented from tilting in the direction indicated by the arrow A1, whereby the cab 4 is prevented from tilting in the direction indicated by the arrow A1.

According to the present embodiment, as illustrated in FIG. 2, the width WL of the lower portion of the front pillar 43R is larger than the width WU of the upper portion of the front pillar 43R. Thus, as illustrated in FIG. 9, even if the front pillar 43R is subjected to a force from the direction indicated by the arrow A1, the front pillar 43R is prevented from tilting in the direction indicated by the arrow A1.

According to the present embodiment, as illustrated in FIG. 8, in the cab 4, the front pillar 43R disposed on the second side face 4R is located behind the front pillar 42L. Although the bracket 60 is disposed on the second side face 4R, since the bracket 60 is not designed to ensure the strength of the cab frame like a pillar, the bracket 60 may be made thinner than a pillar.

Therefore, as compared with the case where the front pillar 42R is disposed on the second side face 4R of the cab 4 as illustrated in FIG. 7C, the use of the bracket 60 as illustrated in FIGS. 7A and 7B reduces the blind spot in the visual field of the operator in the cab 4 including the oblique front of the second side face 4R. Specifically, the visual field of the operator in the cab 4 is as illustrated in FIG. 10. Thus, it is possible to improve the front visibility of the operator in the cab 4 including the oblique front visibility toward the second side face 4R, which makes it possible to enhance the workability of the work implement 2.

According to the present embodiment, as illustrated in FIGS. 2 and 8, in the cab 4, the front pillar 43R is disposed on the second side face 4R behind the front pillar 42L. Thus, the strength of the cab 4 is maintained high by the front pillar 43R.

As described above, according to the cab 4 of the present embodiment, it is possible to enhance the workability by improving the front visibility of the operator in the cab 4 while maintaining the strength of the cab 4.

Although in the above embodiment, it is described that the work implement 2 is disposed on the right side of the cab 4, the work implement 2 may be disposed on the left side of the cab 4. In this case, the left side face of the cab 4 is located closer to the work implement 2 than the right side face. Accordingly, the bracket 60 may be provided in the left front portion of the cab 4, and the front pillar may be provided in the right front portion of the cab 4.

The work implement 2 may be disposed in front of the cab 4. Specifically, the work implement 2 may be attached to the main body 1 (for example, the revolving unit 3) in front of the cab 4. Also in this case, since the front visibility of the operator including the oblique front visibility toward the second side face 4R is improved, the workability of the work implement 2 is enhanced.

The bracket 60 includes a rail member 62 for guiding the front transparent member 46F. Therefore, by sliding the front transparent member 46F along the rail member 62, the front of the cab 4 can be opened and closed.

Although a hydraulic excavator has been described above as an example of a work machine to which the concept of the present disclosure is applied, the work machine may be a crane, a wheel loader, a motor grader or the like, or the work machine may have a crusher, a breaker or the like to replace the bucket 8.

It should be understood that the embodiments disclosed herein have been presented for the purpose of illustration and description but not limited in all aspects. It is intended that the scope of the present invention is not limited to the description above but defined by the scope of the claims and encompasses all modifications equivalent in meaning and scope to the claims.

REFERENCE SIGNS LIST

1: main body; 2: work implement; 3: revolving unit; 4: cab; 4L: first side face; 4LL, 4LR: travel control lever; 4R: second side face; 4S: driver's seat; 5: traveling unit; 5Cr: crawler belt; 6: boom; 7: arm; 8: bucket; 8a: tooth; 9: engine compartment; 10: boom cylinder; 11: arm cylinder; 12: bucket cylinder; 13: boom foot pin; 14: arm pin; 15: bucket pin; 16: first link member; 17: second link member; 18: first link pin; 19: bucket cylinder top pin; 20: second link pin; 31: boom mounting bracket; 41: floor member; 42L, 42R, 43R: front pillar; 43L: central pillar; 44L, 44R: rear pillar; 45: roof member; 46F: front transparent member; 46Fa: frame; 46Fb: roller; 46Fc, 47b, 64, 65: seal member; 46R: lateral transparent member; 46U: lower transparent member; 46Ua: support member; 51F, 51R: beam member; 52L, 52R: frame member; 52Ra: rail groove; 55: base portion; 60, 70: bracket; 61: bracket body; 61a: front portion; 61b, CP: connection portion; 61c: inclined portion; 61d: rail support portion; 61e, 61f: attachment portion; 62, 72: rail member; 62a: upper portion; 62b: lower portion; 63a, 63b: through hole; 67a, 67b: bolt; 100: work machine (hydraulic excavator); CN2: corner; CP: connection portion; GA: gap; P1, P2, P3: position; RX: pivot axis; S1: portion

The invention claimed is:

1. A work machine comprising:
a cab which has a first side face and a second side face facing the first side face and located closer to a work implement than the first side face;
the cab including:
  a first side-face front pillar disposed on the first side face;
  a second side-face front pillar disposed on the second side face and located behind the first side-face front pillar;
  a front transparent member located between the first side face and the second side face;
  a lateral transparent member disposed on the second side face and connected to the second side-face front pillar;
  a roller disposed on the front transparent member; and
  a bracket disposed on the lateral transparent member and provided with a rail member to guide the roller.

2. The work machine according to claim 1, wherein the length of the bracket in a front-rear direction is smaller than the length of the first side-face front pillar in the front-rear direction.

3. The work machine according to claim 1, wherein the width of the bracket in a left-right direction is smaller than the width of the first side-face front pillar in the left-right direction.

4. The work machine according to claim 1, wherein the bracket is detachably attached to a cab frame including the first side-face front pillar and the second side-face front pillar.

5. The work machine according to claim 1, wherein the roller slides in a groove of the rail member, and each of the roller and the groove has a tapered cross section, the width of which along the second side face decreases in a direction from the first side face toward the second side face.

6. The work machine according to claim 1, wherein the bracket includes a connection portion connected to the lateral transparent member and a rail support portion supporting the rail member, and
the rail support portion is located behind the connection portion and closer to the first side face than the connection portion.

7. The work machine according to claim 1, wherein the cab further includes a travel control lever, and in the cab, the second side-face front pillar is located behind a front end of the travel control lever.

8. The work machine according to claim 1, wherein the cab further includes a driver's seat, and in the cab, the second side-face front pillar is located behind a front end of the driver's seat.

9. The work machine according to claim 1 further comprising:
a work implement support bracket which is disposed on the opposite side to the first side face relative to the second side-face front pillar and to which the work implement is attached.

10. The work machine according to claim 9, wherein in the cab, the second side-face front pillar is located behind a front end of the work implement support bracket.

11. The work machine according to claim 9, wherein the width of a lower portion of the second side-face front pillar is larger than the width of an upper portion of the second side-face front pillar.

12. A cab having a first side face and a second side face facing each other, the cab including:
- a first side-face front pillar disposed on the first side face;
- a second side-face front pillar disposed on the second side face and located behind the first side-face front pillar;
- a front transparent member located between the first side face and the second side face;
- a lateral transparent member disposed on the second side face and connected to the second side-face front pillar;
- a roller disposed on the front transparent member; and
- a bracket disposed on the lateral transparent member and provided with a rail member to guide the roller.

* * * * *